Nov. 11, 1958  A. ACKLEY  2,859,689
PELLET MARKING MACHINE
Filed Oct. 28, 1953  5 Sheets-Sheet 1

INVENTOR.
Amos Ackley,
BY Paul & Paul
ATTORNEYS.

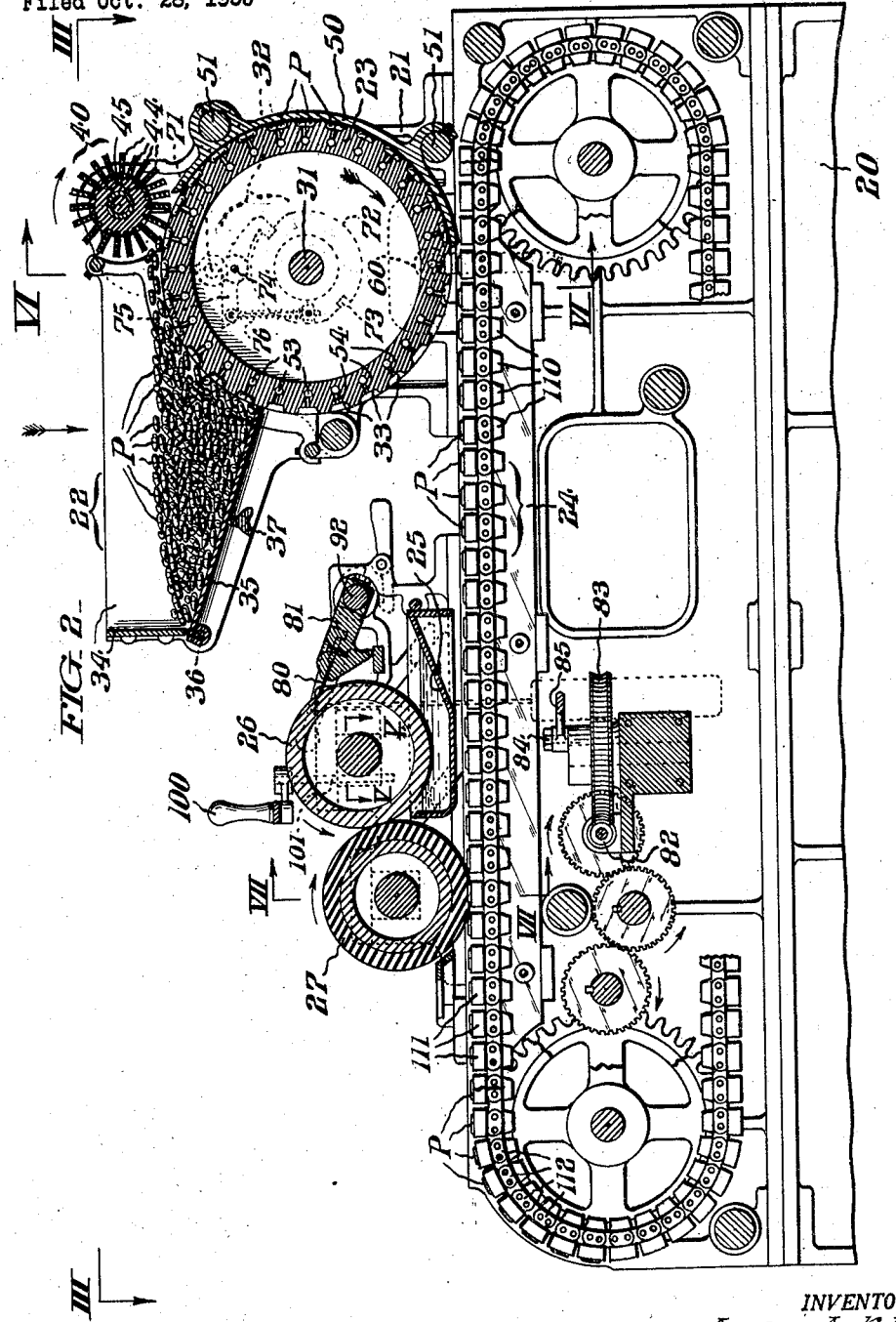

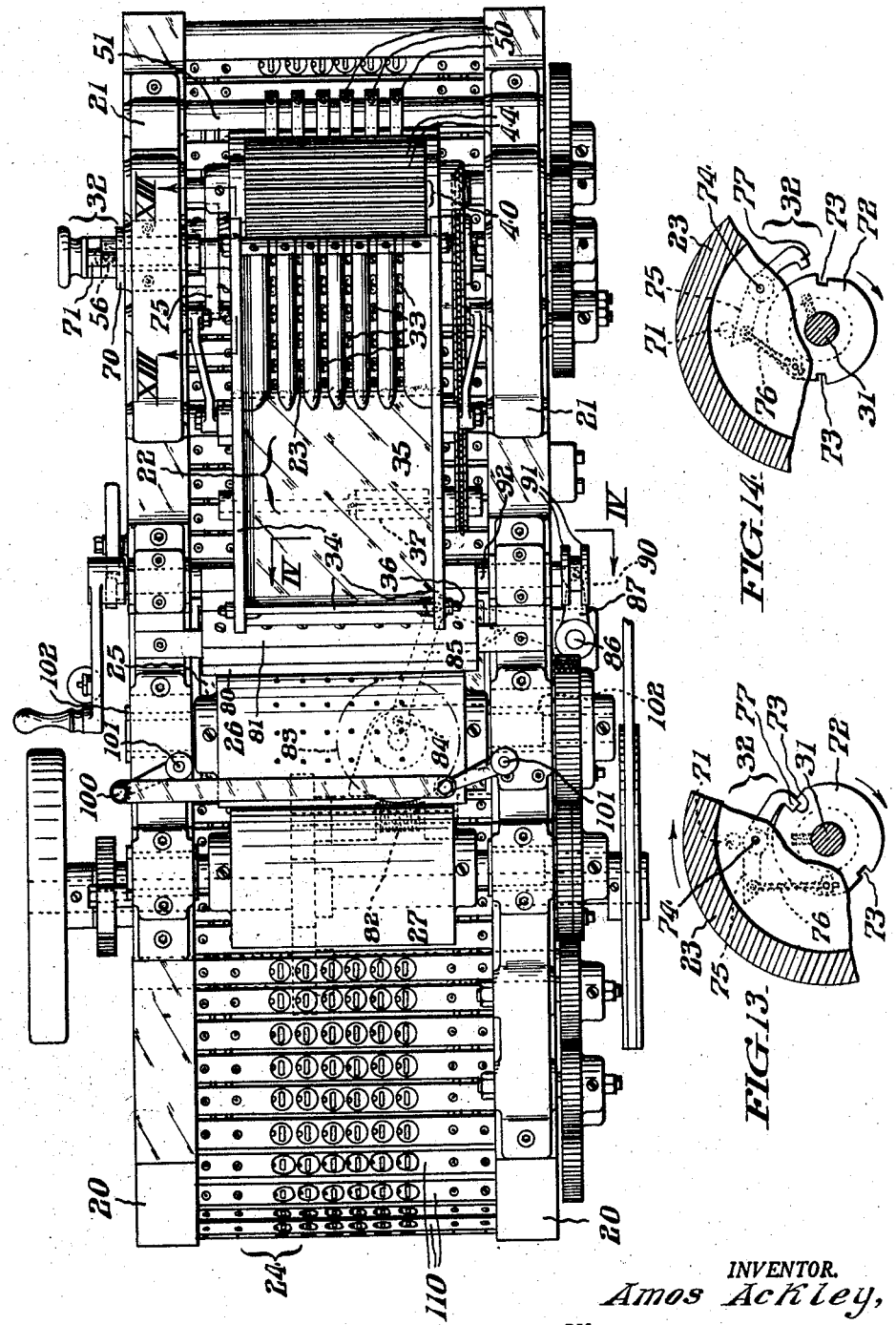

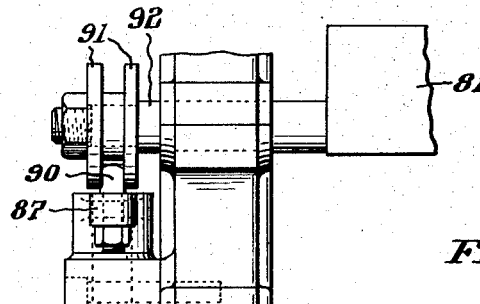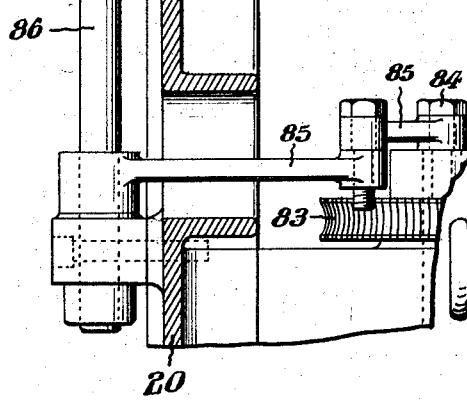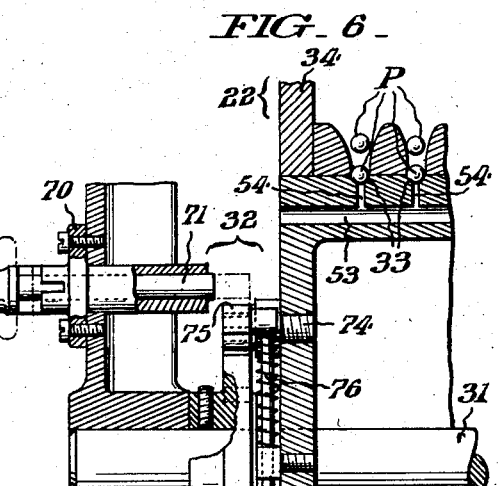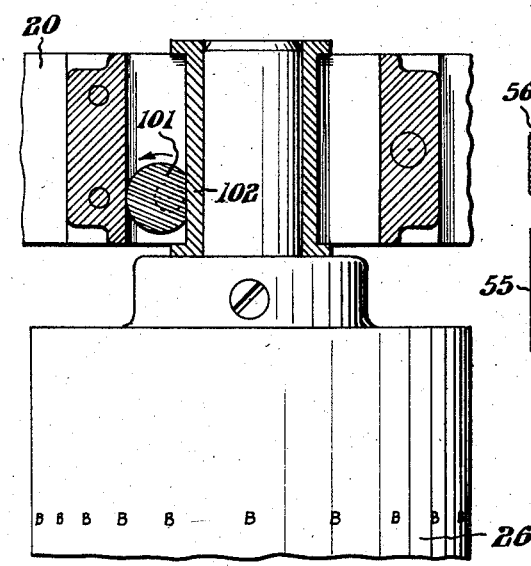

Nov. 11, 1958     A. ACKLEY     2,859,689
PELLET MARKING MACHINE
Filed Oct. 28, 1953     5 Sheets-Sheet 5
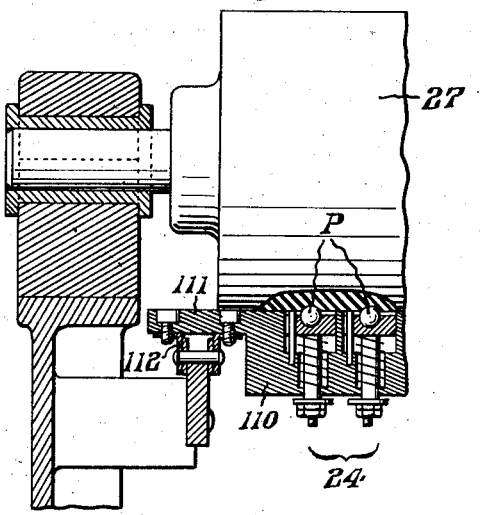
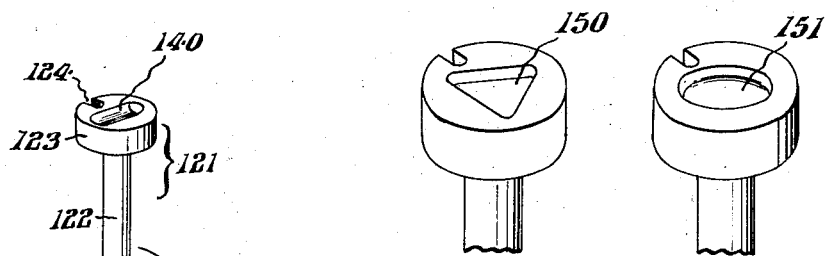
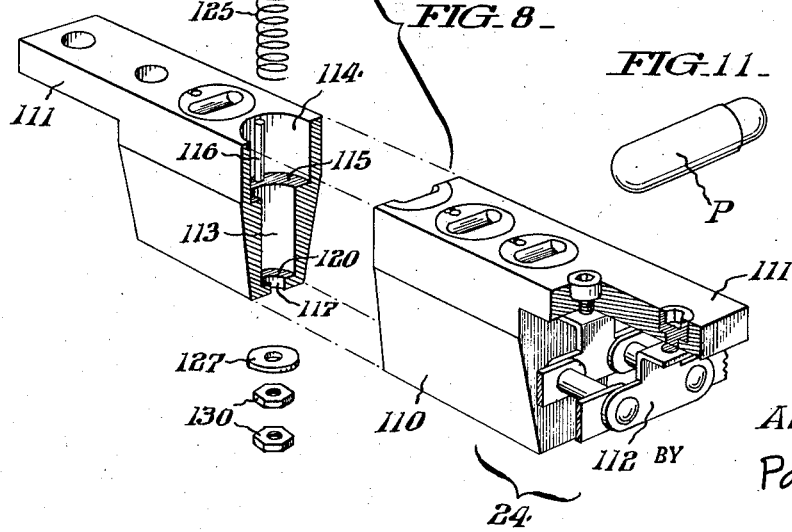
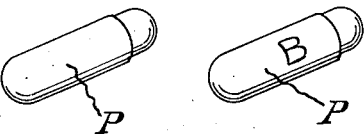
INVENTOR.
Amos Ackley,
BY Paul & Paul
ATTORNEYS.

United States Patent Office 2,859,689
Patented Nov. 11, 1958

2,859,689

PELLET MARKING MACHINE

Amos Ackley, Haddon Heights, N. J., assignor to R. W. Hartnett Company, Philadelphia, Pa., a corporation of Pennsylvania Application October 28, 1953, Serial No. 388,891

4 Claims. (Cl. 101—35)

This invention relates to a pellet marking machine for placing markings or other indicia on relatively small objects such as capsules or pellets, hereinafter referred to generically as pellets.

In the manufacture of pharmaceutical and other products in pellet form it is frequently desired to place the manufacturer's trade-mark or some other marking on each pellet for purposes of ready identification. Heretofore, certain of the granular type pellets have been molded or cast or otherwise formed with specific markings thereon, and in certain instances some of these pellets have been marked by means of fluids such as inks and the like. However, printing or otherwise marking pellets with fluid is subject to very substantial operating difficulties, particularly when it is desired to mark or print the pellets with small, fine-lined indicia on a mass production scale.

It has heretofore been found particularly difficult to place clear, legible markings on capsules or pellets which are yieldable in character. Such capsules or pellets often consist of a powder enclosed in a water soluble envelope of a non-rigid character.

It is accordingly an object of this invention to provide an apparatus for applying markings to small objects such as pellets or the like in mass production. Another object of this invention is to provide an apparatus of this character which is adapted to apply clear and legible printed markings to capsules, pellets and the like. Still another object of the invention is to provide an apparatus for printing markings on pellets without damaging the pellets. Other objects and advantages of this invention will further appear hereinafter and in the drawings, whereof:

Fig. 2 represents a vertical sectional view of the upper portion of the machine, taken as indicated by the lines and arrows II—II which appear in Fig. 1;

Fig. 3 represents a plan view of the machine, taken as indicated by the lines and arrows III—III which appear in Fig. 2;

Fig. 4 represents a sectional view taken as indicated by the lines and arrows IV—IV which appear in Fig. 3;

Fig. 5 represents a sectional view taken as indicated by the lines and arrows V—V which appear at the central portion of the transfer roller 26 in Fig. 2;

Fig. 6 represents a sectional view taken through the pellet feeding cylinder as indicated by the lines and arrows VI—VI which appear in Fig. 2;

Fig. 7 represents a fragmentary view showing an end portion of the printing roller comprising one component of the apparatus, this view being taken as indicated by the lines and arrows VII—VII which appear in Fig. 2;

Fig. 8 represents a fragmentary, partially exploded view in perspective showing one of the transverse segments of the endless belt illustrated in Figs. 1–3;

Figs. 9 and 10 represent fragmentary perspective views of modified forms of the upper portions of pellet carriers carried by the endless belt segment illustrated in Fig. 8;

Figs. 11 and 12 illustrate one form of pellet having an elongated body, the pellet being free of any marking in Fig. 11 and marked in Fig. 12;

Fig. 13 represents a sectional view of the clutch mechanism taken as indicated by the lines and arrows XIII—XIII which appear in Fig. 3; and Fig. 14 is a view similar to Fig. 13, showing the clutch mechanism disengaged.

Figure 1:
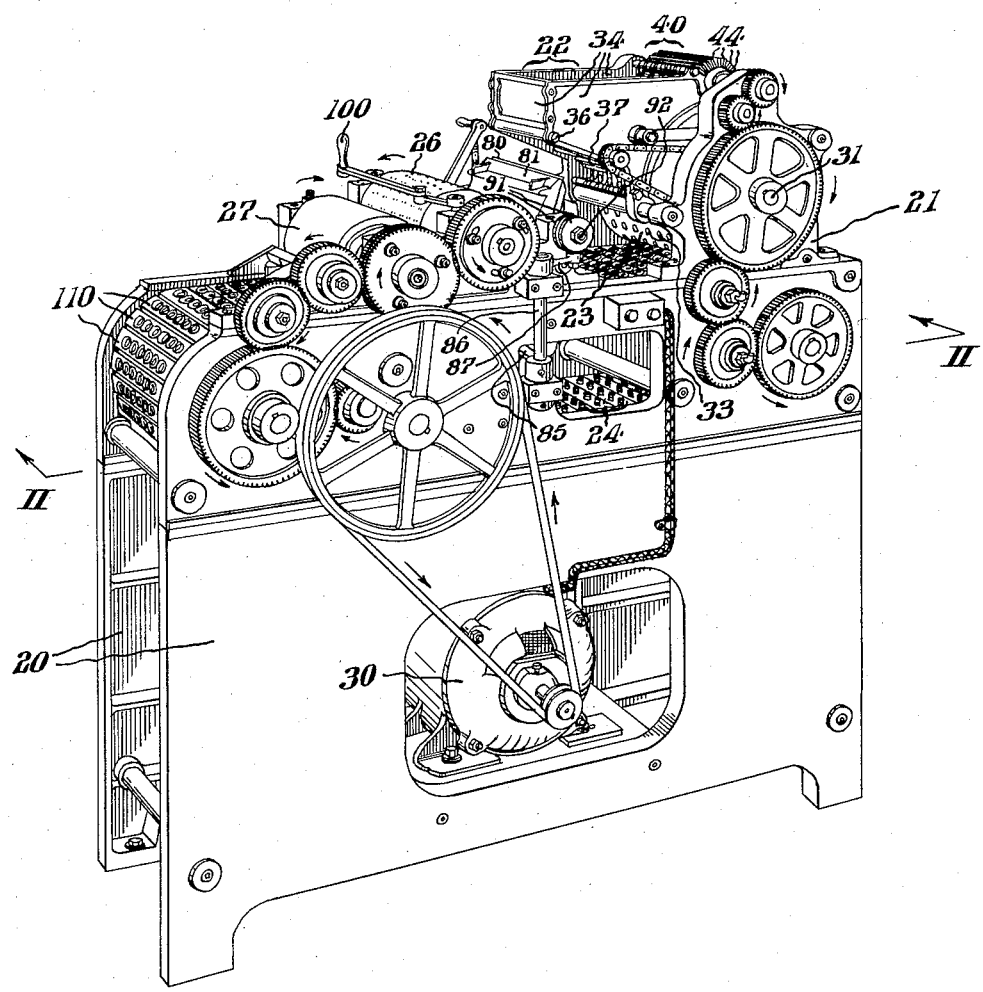
Fig. 1 represents a view in perspective showing a pellet printing machine constituting one embodiment of this invention.

Turning now to the specific embodiment of the invention selected for illustration in the drawings, the number 20 designates a pair of substantially vertical side frame members rigidly supported by transverse braces. Cylinder roll frames 21 are rigidly secured to the tops of frame members 20, and are equally spaced from one another. Supported on the cylinder roll frames 21 is a hopper 22 which serves as a storage container for the pellets. Rotatably supported by the frames 21 adjacent to the hopper 22 is a cylinder roll 23. Directly below cylinder roll 23 is a horizontally disposed endless conveyor 24 which is arranged to carry a plurality of individual pellets in the course of the printing or marking operation, as will further appear.

The number 25 designates a reservoir supported above the conveyor containing ink or other fluid which is to be applied to the pellets. A transfer roller 26 is rotatably mounted on a transverse shaft above the reservoir 25 with a portion of the roller 26 immersed in the fluid. The surface of roller 26 is preferably etched or similarly indented or provided with markings which have capacity to retain the fluid. A printing roller 27 is rotatably mounted on the frame in contact with the transfer roller 26. Printing roller 27 preferably has a rubber surface which is adapted to receive and retain the fluid from the impressions on transfer roller 26, and then to print the resulting markings on the pellets which are carried on the endless conveyor 24. Thus, the printing roller 27 is immediately above and adjacent to the pellet conveyor.

Means are provided for rotating the devices just described. The means shown in the drawings consists of an electric motor 30 carried on the frame, together with conventional pulleys, pulley belt, and gear trains connected for rotation as indicated by arrows in the drawings.

The cylinder roll 23 is mounted free on a cylinder roll shaft 31 and operable through a clutch mechanism 32 from the drive mechanism just described. The outer surface of cylinder roll 23 is provided with a plurality of equally spaced recesses 33 arranged in circumferential and longitudinal rows. The recesses 33 are formed in accordance with the shapes and sizes of the pellets P to be processed. Such pellets, for example, are illustrated in Figs. 11 and 12. Each recess 33 is of a depth to accommodate about half of the pellet.

Referring more particularly to Fig. 2, the hopper 22 has walls 34 and a floor 35 pivoted at 36 for swinging movement with respect to the cylinder roll 23. A star wheel agitator 37 is rotatably supported below the floor 35 and connected into the gear train for continuous rotation. Floor 35 contacts agitator 37 by reason of its own weight and is bumped up and down by the agitator 37, thereby agitating the pellets causing them to move into the recesses 33 of the cylinder roll 23.

A pellet distributor roller 40 is rotatably mounted on the cylinder roll frame 21 and extends transversely substantially parallel to the cylinder roll 23. Distributor roller 40 is continuously rotated through a gear connected into the gear train to rotate in a direction opposite to the rotation of cylinder roll 23. Fixed in longitudinal slots 45 on roller 40 are a plurality of flexible elongated strips 44 which extend radially outwardly with their outer edges in contact with the cylinder roll. The strips 44, preferably made of rubber, sweep the excess pellets over the top of cylinder roll 23 back toward the hopper 22, thereby facilitating the distribution and seating of the pellets in their recesses.

Retainer members 50 of generally cylindrical curvature are supported on a plurality of cross rods 51 adjacent the downwardly moving portion of cylinder roll 23. Retainer members 50 extend from the distributor roller 40 down to the bottom of cylinder roll 23, terminating just before the downwardly moving pellets reach the bottom of their path of movement. The retainer members 50 maintain the pellets P in their recesses as the pellets move downwardly, and release them at the bottom of said path for transfer by further downward movement to the corresponding recesses on the endless conveyor 24.

Means are provided in the cylinder roll 23 for assisting the transfer of the pellets to the endless conveyor 24. Such means includes a plurality of transverse passages 53 connected to short radial passages 54 which enter into the bottoms of the individual recesses 33. All such passages are connected to a source of fluid such as compressed air or the like, as shown more particularly in Fig. 6 of the drawings. The number 55 represents an inlet pipe for the pressurized fluid which is connected through an elbow 56 to a coupling 57 longitudinally slidable inside a sleeve 60 which is fixed on the frame 20. A helical compression spring 61 bears at one end on a shoulder 62 in sleeve 60 and at the other end on a shoulder 63 on coupling 57. At its end adjacent the cylinder roll 23 the coupling 57 is dished to retain an apertured bearing disc 64 which connects with the transverse passages 53 and is continuously urged against the side wall of cylinder roll 23. Thus the pressurized fluid is directed through each transverse passage 53 when it reaches the bottom of its path of movement, but the pressurized fluid is not supplied to other passages 53 otherwise located.

Fig. 6 also shows the clutch mechanism 32 through which the cylinder roll is operated. Referring also to Figs. 2, 13 and 14, the clutch mechanism comprises a guide sleeve 70 fixed on frame 21 carrying a reciprocable pin 71. Fixed to the power driven cylinder roll shaft 31 is a notched disc 72 having notches 73. Pivoted to cylinder roll 23 at pivot 74 is a pawl 75 normally acted upon by a compression spring 76 to keep its notch-engaging end 77 in engagement with the notches on disc 72. Accordingly, driven shaft 31 drives the cylinder roll 23 through pawl 75 and notched disc 72 when pin 71 is retracted to the position shown in solid lines in Fig. 6. However, when pin 71 is moved toward the cylinder roll 23 to the position shown in dot-dash lines in Fig. 6, pin 71 trips pawl 75 in the manner shown in Figs. 13 and 14, separating the pawl from the notched disc leaving the cylinder roll free on its shaft.

Figs. 2, 3 and 4 illustrate a mechanism for operating a wiping device for removing excess marking fluid from the transfer roller 26. The wiping device has the form of a resilient wiper blade 80 (Fig. 2) which is carried in a transversely reciprocable clamp 81. The reciprocating mechanism includes a worm 82 (Fig. 3) driven from the power drive mechanism meshing with a worm gead 83 carrying a pivot 84 which reciprocates a bell crank lever 85 connected through a vertical shaft 86 to a lever 87 having a finger 90 intermediate a pair of spaced discs 91, 91 on the reciprocable wiper shaft 92. Accordingly, it will be appreciated that the wiper blade 80 reciprocates longitudinally of the transfer roller 26 as it wipes the excess marking fluid therefrom. This is an advantageous feature since it greatly improves the quality and clarity of the markings ultimately to be applied to the pellets.

The transfer roller 26 and printing roller 27 may readily be separated by lever 100 which is connected to eccentric vertical rods 101 extending, as indicated in Fig. 5, adjacent the bearings 102 of the transfer roller 26.

The endless conveyor 24 shown in the drawings consists of a plurality of transverse bars 110 (see particularly Figs. 6, 7 and 8) each having at each end a wing 111. The wings 111 are rigidly secured to link members 112 which are pivotally connected to adjacent link members in a conventional manner to form an endless conveyor. Formed in each bar 110 is a plurality of equally spaced vertically arranged openings each including a small-bore lower portion 113 and an upper portion 114 having a larger bore, thereby creating a shoulder 115. A vertical key 116 extends along the periphery of upper bore portion 114. An opening 117 is formed at the bottom of each small bore portion 113, creating a shoulder 120. Pellet carriers 121 are provided for each vertical opening, each having a shaft 122 arranged to reciprocate up and down in the small bore portion 117. Fixed at the top of each shaft 122 is a head 123 of a size to reciprocate up and down in the large bore portion 114, provided with a keyway 124 coacting with key 116 to prevent the pellet carrier from rotating with respect to the conveyor. A helical spring 125 extends around the shaft 122 with its ends bearing against shoulder 120 and the bottom of head 123. The threaded lower end 126 of shaft 122 extends through hole 117 and is secured against unlimited vertical movement by washer 127 and nuts 130, 130. Accordingly, it will be appreciated that each pellet carrier has capacity yieldably to reciprocate up and down with respect to its supporting member.

Formed in the upper surface of each pellet carrier is an elongated recess 140 aligned with the direction of movement of the conveyor. As appears in Fig. 6, the pellets P extend upwardly above the surface of the conveyor. Fig. 7 also shows that the rubber or other elastic face of the printing roller 27 yields in contact with the pellets P while placing the markings thereon, the pellets also being yieldably supported from below under the influence of springs 125. This combination is an important and advantageous feature of the invention, providing for clarity and uniformity of marking while concurrently protecting the pellets against undue pressure which might cause damage.

In the operation of the apparatus, pellets are charged into the hopper 22 and are fed to the recesses in the cylinder roll 23. The pellets are then transferred, as heretofore described, to the recesses in conveyor 24, it being understood that the cylinder roll and conveyor are geared together in such manner that the corresponding recesses are in registry with one another and have a common linear velocity. The pellets are marked by the printing roller 27 which functions as already outlined herein, and the marked pellets drop out of their recesses at the end of the upper flight of the conveyor for collection in any desired manner.

It will be appreciated that the pellet marking machine is capable of processing pellets of widely variable forms. For example, Figs. 9 and 10 show triangular and circular recesses 150, 151 which are formed in pellet carrier heads similar to the head shown in Fig. 8.

While I have shown and described in detail the apparatus constituting one form of my invention, it will be appreciated that modifications may be made in the form of the pellet marking machine, including reversals of parts, substitutions of equivalents, and the use of certain features of the invention independently of others, all within the spirit and scope of the invention as defined in the appended claims.

Having thus described the invention, I claim:

1. In a pellet printing machine the combination comprising a printing roller having a resilient, substantially cylindrical printing surface, means for rotating said printing roller, means for applying printing fluid indicia to said printing surface, a pellet conveyor, means for moving said pellet conveyor below and adjacent the printing surface of said printing roller in timed relation to the movement thereof, a plurality of individual pellet carriers carried by said conveyor with capacity for rectilinear movement up and down relative to said conveyor, means for restraining said pellet carriers against movement other than up and down relative to said conveyor, and means continuously urging said carriers upwardly toward said printing roller.

2. The pellet printing machine defined in claim 1 wherein each carrier comprises a bar extending transversely across the conveyor and having recesses spaced transversely across the conveyor constituting containers for the pellets.

3. The pellet printing machine defined in claim 2 wherein the recesses are elongated and extend substantially longitudinally of said conveyor.

4. In a pellet printing machine the combination comprising pellet conveyor means, printing means, means for moving said pellet conveyor means below and adjacent the printing surface of said printing means in timed relation to the movement thereof, a plurality of individual pellet carriers carried by said conveyor means with capacity for rectilinear movement up and down relative to said conveyor means, means for restraining said pellet carriers against movement other than up and down relative to said conveyor, means continuously urging said carriers upwardly toward said printing means, said printing means including a printing roller having a resilient, substantially cylindrical printing surface, means for rotating said printing roller, means for applying printing fluid indicia to said printing surface, a reservoir for said printing fluid, a transfer roller rotatably positioned with its surface in contact with said fluid, said surface having inscriptions spaced in accordance with the spacing of the pellet carriers, and means for wiping the excess fluid from the transfer roller, said transfer roller contacting said printing roller to transfer the fluid inscriptions to said printing roller.

References Cited in the file of this patent

UNITED STATES PATENTS

| | | |
|---|---|---|
| 705,631 | Anthony | July 29, 1902 |
| 1,283,579 | Smith | Nov. 5, 1918 |
| 1,328,733 | Harriss | Jan. 20, 1920 |
| 1,365,879 | Wysong | Jan. 18, 1921 |
| 1,369,570 | Stiles | Feb. 22, 1921 |
| 1,499,796 | Wilkinson | July 1, 1924 |
| 2,077,970 | Trunk | Apr. 20, 1937 |
| 2,134,041 | Hamm | Oct. 25, 1938 |
| 2,152,101 | Scherer | Mar. 28, 1939 |
| 2,402,144 | Baker | June 18, 1946 |
| 2,447,090 | Pollock | Aug. 17, 1948 |

FOREIGN PATENTS

| | | |
|---|---|---|
| 482,642 | Great Britain | Apr. 1, 1938 |